(12) United States Patent
Roberts et al.

(10) Patent No.: US 8,917,718 B2
(45) Date of Patent: Dec. 23, 2014

(54) SYSTEM, METHOD, AND APPARATUS FOR USER-INITIATED PROVISIONING OF A COMMUNICATION DEVICE

(75) Inventors: Mike A. Roberts, Overland Park, KS (US); Shekhar Gupta, Overland Park, KS (US); Jim Kevin Edwards, Leawood, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1145 days.

(21) Appl. No.: 12/250,349

(22) Filed: Oct. 13, 2008

(65) Prior Publication Data

US 2010/0091762 A1    Apr. 15, 2010

(51) Int. Cl.
    *H04L 12/66*    (2006.01)

(52) U.S. Cl.
    CPC ..................... *H04L 12/66* (2013.01)
    USPC ....... 370/352; 380/270; 379/201.12; 370/241

(58) Field of Classification Search
    CPC .. H04L 12/66; H04L 41/0806; H04L 41/0869
    USPC ................. 370/236, 420, 331, 389, 352, 392;
                    709/203; 704/246, 247; 455/456.5,
                    455/410, 445; 379/207.15
    See application file for complete search history.

(56) References Cited

U.S. PATENT DOCUMENTS

| | | | | |
|---|---|---|---|---|
| 5,414,697 | A * | 5/1995 | Osaki ............................ | 370/236 |
| 6,901,425 | B1 * | 5/2005 | Dykes et al. .................. | 709/203 |
| 7,447,632 | B2 * | 11/2008 | Itou .............................. | 704/247 |
| 7,580,402 | B2 * | 8/2009 | Masuhiro et al. ............. | 370/352 |
| 7,639,792 | B2 * | 12/2009 | Qiu et al. ................. | 379/207.15 |
| 7,996,013 | B2 * | 8/2011 | Hansson et al. ............... | 455/445 |
| 2002/0085577 | A1 * | 7/2002 | Kim .............................. | 370/420 |
| 2002/0110121 | A1 * | 8/2002 | Mishra ......................... | 370/389 |
| 2006/0020460 | A1 * | 1/2006 | Itou .............................. | 704/246 |
| 2006/0168167 | A1 * | 7/2006 | Kushalnagar et al. ........ | 709/222 |
| 2006/0218624 | A1 * | 9/2006 | Ravikumar et al. ............. | 726/3 |
| 2007/0036358 | A1 * | 2/2007 | Nguyen et al. ................ | 380/270 |
| 2007/0167175 | A1 * | 7/2007 | Wong et al. ................ | 455/456.5 |
| 2007/0177548 | A1 * | 8/2007 | Oyama et al. ................. | 370/331 |
| 2007/0220596 | A1 * | 9/2007 | Keeler et al. ...................... | 726/7 |
| 2007/0258456 | A1 * | 11/2007 | Khouderchah et al. ....... | 370/392 |
| 2008/0049623 | A1 * | 2/2008 | Qiu et al. ...................... | 370/241 |
| 2008/0130628 | A1 * | 6/2008 | Lin et al. ...................... | 370/352 |
| 2009/0028315 | A1 * | 1/2009 | Tovino ..................... | 379/201.12 |
| 2010/0144313 | A1 * | 6/2010 | Chun et al. .................... | 455/410 |

FOREIGN PATENT DOCUMENTS

JP          2002163392 A  *  6/2002  ............. G06F 17/60

* cited by examiner

*Primary Examiner* — Khaled Kassim
*Assistant Examiner* — Parth Patel
(74) *Attorney, Agent, or Firm* — Swanson & Bratschun, L.L.C.

(57) ABSTRACT

An embodiment of a method and apparatus for provisioning of a communication device includes receiving a registration request from a first communication device. The registration request includes an address associated with the first communication device. The method further includes registering the first communication device in response to receiving the registration request, placing a call request to the first communication device, and establishing a call session with the first communication device. The method further includes prompting a user of the first communication device for a user identifier, and receiving a user identifier from the user of the first communication device. The method still further includes sending one or more configuration parameters associated with the user identifier to the first communication device. The one or more configuration parameters are operable to configure the first communication device.

14 Claims, 3 Drawing Sheets

SYSTEM, METHOD, AND APPARATUS FOR USER-INITIATED PROVISIONING OF A COMMUNICATION DEVICE

BACKGROUND

In today's voice over IP (VoIP) environment, provisioning of VoIP phones is typically a "high touch" process. Typically, a truck rolls and or an on-site technician must be sent to a customer's premises in order that the VoIP phone may be installed and configured by the on-site technician so that the VoIP phone may provide the particular services desired by a user. The VoIP phone must then be provisioned at a feature server before the VoIP phone may operate on a communication network or use the features provided by a feature server. This requirement for truck rolls and on-site technicians makes the provisioning process both costly and time consuming.

BRIEF SUMMARY

An embodiment of a method for provisioning of a communication device includes receiving a registration request from a first communication device. The registration request includes an address associated with the first communication device. The method further includes registering the first communication device in response to receiving the registration request, placing a call request to the first communication device, and establishing a call session with the first communication device. The method further includes prompting a user of the first communication device for a user identifier, and receiving a user identifier from the user of the first communication device. The method still further includes sending one or more configuration parameters associated with the user identifier to the first communication device. The one or more configuration parameters are operable to configure the first communication device.

An embodiment of an apparatus for provisioning of a communication device includes a memory and at least one processor. The at least one processor is configured to retrieve computer readable instructions from the memory and execute the computer readable instruction so as to receive a registration request from a first communication device. The registration request includes an address associated with the first communication device. The at least one processor is further configured to register the first communication device in response to receiving the registration request, and receive a user identifier from the first communication device. The at least one processor is further configured to send one or more configuration parameters associated with the user identifier to the first communication device. The one or more configuration parameters are operable to configure the first communication device.

An embodiment of a method for user-initiated provisioning a communication device includes sending a registration request to a feature server. The registration request includes an address associated with a first communication device. The method further includes receiving a call request from the feature server in response to sending the registration request, and establishing a call session with the feature server. The method further includes receiving a prompt from the feature server for a user to provide a user identifier, receiving a user identifier from the user, and sending the user identifier to the feature server. The method further includes receiving one or more configuration parameters associated with the user identifier. The one or more configuration parameters are operable to configure the first communication device.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
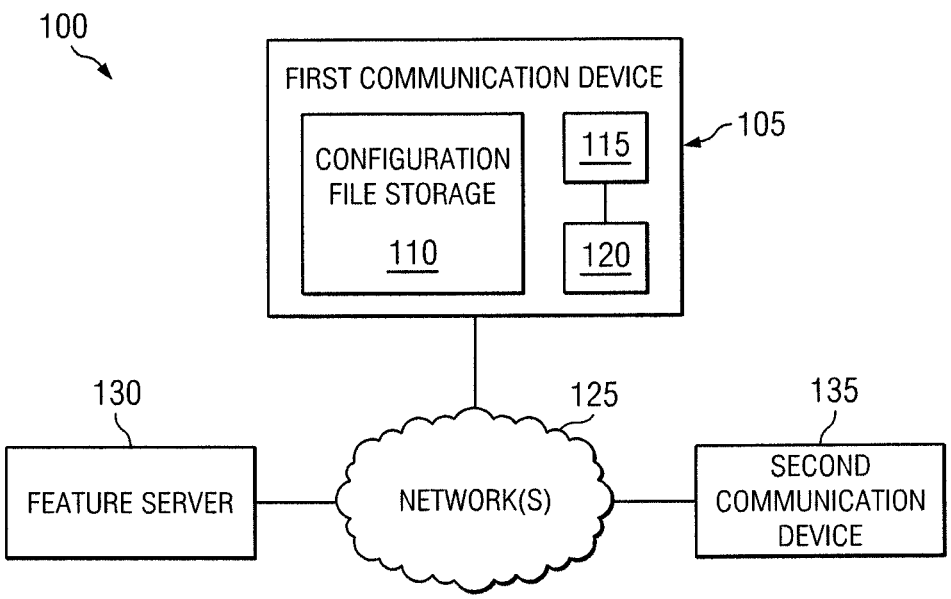
FIG. 1 is an embodiment of a system for user-initiated provisioning of a communication device by a feature server.

FIG. 1 is an embodiment of a system 100 for user-initiated provisioning of a communication device by a feature server. System 100 includes a first communication device 105 and a second communication device 135 in communication with a feature server 130 over a network 125.

In various embodiments, the first communication device 105 is a packet-based telephony network phone. In a particular embodiment, the first communication device 105 is a VoIP phone. In still other embodiments, the first communication device 105 may include a cell phone, a wireless phone, a software phone, or any other communication device. The first communication device 105 includes a configuration file storage 110, a processor 115 and a memory 120. The configuration file storage 110 is configured to store one or more configuration files for use in configuring the first communication device 105. The configuration files include configuration information and configuration parameters for the first communication device 105. For example, the configuration parameters may include configuration information required to support calling features available for the first communication device 105. The processor 115 is configured to retrieve computer readable instructions from the memory 120 and execute the computer readable instructions to perform the various functions of the first communication device 105, described herein. In various embodiments, the first communication device 105 is configured to initiate and receive requests to establish communication sessions with one or more other communication devices. In particular embodiments, the communication sessions include a voice calling session.

In various embodiments, the network(s) 125 is one or more of a wireless network, a wired network, a packet switched network, an asynchronous transfer mode (ATM) network, a public switched telephone network (PSTN), and any other communication network.

In various embodiments, the feature server 130 is configured to provide calling features and other desired phone features to the first communication device 105, as well as provision the first communication device 105 for operation with the network(s) 125. Examples of call features that may be provided to the first communication device 105 by the feature server 130 include calling forwarding, selective call forwarding, selective call acceptance, selective call rejection, call blocking, conference calling, call directories, 911 services, and voice mail services. A particular embodiment of the feature server 130 is further described with respect to FIG. 2.

In various embodiments, the second communication device 135 may include a telephone, a mobile phone, or any other communication device. Upon provisioning of the first communication device 105, a user or the first communication device 105 may send or receive call requests to and from the second communication device 135, and use calling features provided by the feature server 130.

Figure 2:
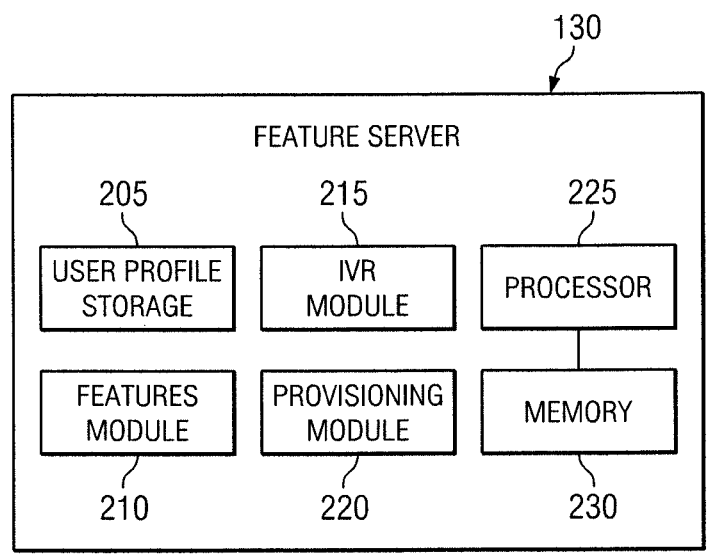
FIG. 2 is an embodiment of the feature server of FIG. 1.

FIG. 2 is an embodiment of the feature server 130 of FIG. 1. The feature server 130 includes a user profile storage 205, a features module 210, an IVR module 215, a provisioning module 220, a processor 225, and a memory 230.

The user profile storage 205 is configured to store one or more user profiles associated with one or more users or customers that are to use calling features or services provided by the feature server 130. In various embodiments, each user profile is associated with a particular communication device in communication with the network(s) 125, for example, the first communication device 105. In a particular embodiment, a particular user profile includes a user identifier associated with the first communication device 105, an address associated with the first communication device 105, and a configuration file associated with the user identifier. In at least one embodiment, the configuration file includes configuration parameters for configuring the first communication device 105 for operation with the network(s) 125, and for operation with any features and/or services provided by the feature server 130 to which the user is authorized.

The features module 210 is configured to provide one or more calling features and service to communication devices registered with the feature server 130. In a particular embodiment, the features module 210 is configured to provide one or more calling features and/or services to the first communication device 105 that are authorized.

The IVR module 215 is configured to receive a voice input from a user of the first communication device 105, process the voice input, and perform a desired function or functions in response to the voice input. In a particular embodiment, the IVR module 215 may receive a user identifier spoken by the user of the first communication device 105. The feature server 130 may then match the user identifier to a corresponding user profile for use in configuring and provisioning the first communication device 105.

The provisioning module 220 is configured to provision the first communication device 105 for operation with the feature server 130 and the network(s) 125. In a particular embodiment, the provisioning module 220 is configured to receive an address associated with the first communication device 105, for example, a media access control (MAC) address, and populate a provisioning table with the received address. In various embodiments, the provisioning module 220 is operable to receive a user identifier associated with the first communication device 105 from a user of the first communication device, and send a configuration file associated with the user identifier to the first communication device 105 in response to receiving the user identifier.

As described, the feature server 130 further includes a processor 225 and a memory 230. In various embodiments, the processor 225 is configured to retrieve computer readable instructions from the memory 230 and execute the computer readable instructions to perform the various functions of the feature server 130 described herein.

Figure 3:
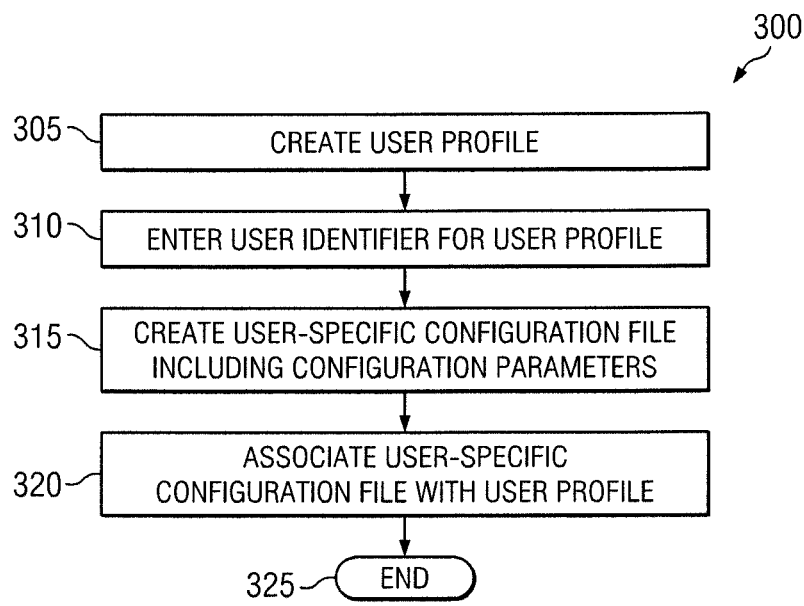
FIG. 3 is an embodiment of a procedure for creating a user profile for provisioning a communication device.

FIG. 3 is an embodiment of a procedure 300 for creating a user profile for provisioning a communication device. In step 305, an operator of the feature server 130 creates a user profile to be associated with a particular user of the first communication device 105. In at least one embodiment, the operator creates the user's profile by first logging onto a portal provided for accessing set-up and configuration functions of the feature server 130. In a particular embodiment, the portal is a web portal. In step 310, the operator enters a user identifier for the user's profile. The user identifier identifies the particular user of the first communication device 105. Examples of user identifiers that may be used in various embodiments, include a user name, an email address, an employee ID number, a social security number, and a phone number associated with the user. In step 315, the operator creates a user-specific configuration file for the first communication device 105. The user-specific configuration file includes configuration parameters used to configure the first communication device 105 for operation. For example, the configuration parameters may include parameters related to the calling features and/or services authorized for the first communication device 105, a company logo to be displayed on a display screen of the first communication device 105, phone lines that ate activated for use by the first communication device 105. Examples of call features include call forwarding and 911 services that may be used with the first communication device 105.

In step 320, the user-specific configuration file is associated with the user profile. The user profile is then stored in the user profile storage 205 for subsequent download to the first communication device 105 during a provisioning procedure. In at least one embodiment, the first communication device 105 is preconfigured with a default configuration file within the configuration file storage 110. The default configuration file is not specific to a particular user. In various embodiments, the first communication device 105 is drop shipped to a customer premise location and a user is instructed to couple the first communication device 105 to a power source and network connection. Upon coupling the first communication device 105 to a power source and a network connection, the first communication device 105 retrieves an address associated with the feature server 130 from the default configuration file and sends a registration request to the feature server 130 with a destination address equal to the address associated with the feature server 130. In a particular embodiment, the address associated with the feature server 130 is an IP address. In various embodiments, the feature server 130 is configured to send the user-specific configuration file to the first communication device 105 in response to receiving the registration request. In some embodiments, the feature server 130 is further configured to provision the first communication device 105 at the feature server 130.

Figure 4:
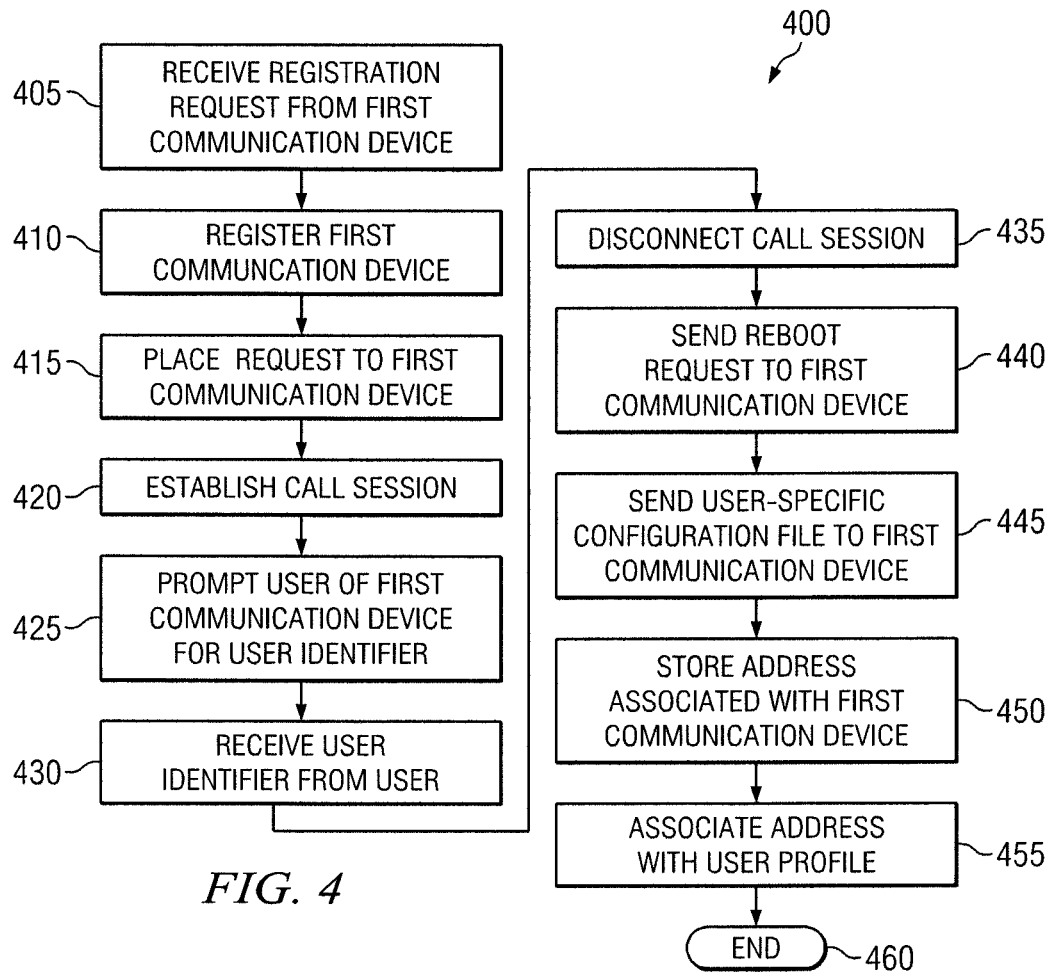
FIG. 4 is an embodiment of a procedure for user-initiated provisioning the first communication device by the feature server.

FIG. 4 is an embodiment of a procedure 400 for provisioning the first communication device 105 by the feature server 130. In step 405, the feature server 130 receives the registration request from the first communication device 105. The registration request includes an address associated with the first communication device 105. In a particular embodiment, the address associated with the first communication device 105 is a MAC address of the first communication device 105. In step 410, the feature server 130 registers the first communication device 105 at the feature server 130. After the first communication device 105 has been registered by the feature server 130, the feature server 130 places a call request to the first communication device 105. When a user of the first communication device 105 answers the call request from the feature server 130, a call session is established between a first communication device 105 and the feature server 130 in step 420. In step 425, the feature server 130 prompts the user of the first communication device 105 to provide a user identifier associated with the user. In a particular embodiment, the IVR module 215 of the feature server 130 provides an audible prompt to the user to provide the user identifier by speaking the user identifier into a microphone or handset of the first communication device 105. In still other embodiments, the feature server 130 may prompt the user of the first communication device 105 to enter the user identifier using a keypad or other tactile input device of the first communication device 105. In various embodiments, the user identifier may include a user name, an email address, an employee ID number, a social security number, or a phone number associated with the particular user. In step 430, the feature server 130 receives the user identifier from the user of the first communication device 105.

In step 435, the call session between the first communication device 105 and the feature server 130 is disconnected. In a particular embodiment, the IVR module 215 of the feature server 130 prompts the user of the first communication device 105 to hang up in order to disconnect the call session. After disconnection of the call session, the feature server 130 sends a reboot request to the first communication device 105 in step 440. The reboot request instructs the first communication device 105 to reboot and/or restart. In step 445, the feature server 130 matches the user identifier to an associated user profile stored in the user profile storage 205 and sends a user-specific configuration file associated with the user profile to the first communication device 105. In various embodiments, the user-specific configuration file is used by the first communication device 105 to configure the user communication device 105 for operation with the feature server 130, as well as with the authorized features provided for the first communication device 105 by the feature server 130.

In step 450, the address associated with the first communication device is stored by the feature server 130. In a particular embodiment, the feature server 130 stores the address in a provisioning table of the processing module 220. In a particular embodiment, the address is a MAC address of the first communication device 105 and is populated in a provisioning table of the feature server 130. In step 455, the address associated with the first communication device 105 is associated with the user profile. Accordingly, the user profile, the address associated with the first communication device 105, and the user-specific configuration file are associated together and stored within the user profile storage 205 of the feature server 130.

After configuration and provisioning of the first communication device 105 by the feature server 130, the first communication device 105 is configured to operate with the feature server 130 and network(s) 125 and features provided by the feature server 130 and placing and receiving calls with other communication devices coupled to the network(s) 125, such as the second communication device 135. In step 460, the procedure 400 ends.

Figure 5:
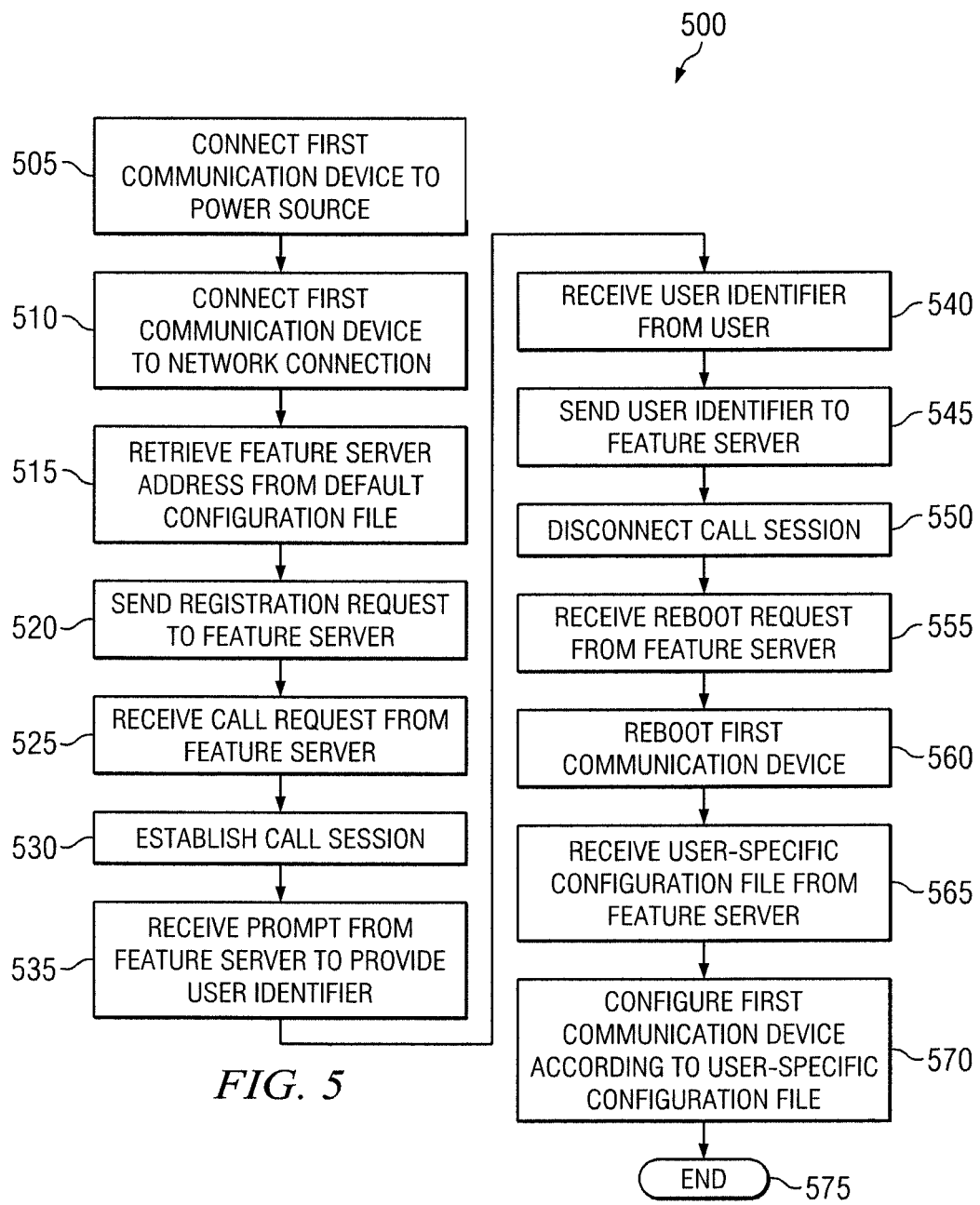
FIG. 5 is another embodiment of a procedure for user-initiated provisioning of the first communication device.

FIG. 5 is another embodiment of a procedure 500 for user-initiated provisioning of the first communication device 105. In various embodiments, a user profile is created for a particular user of the first communication device 105, such as described with respect to FIG. 3. A user identifier associated with the user profile is created. Further, a user-specific configuration file including one or more configuration parameters is created and associated with the user identifier. The user profile and associated information is then stored in the user profile storage 205 of the feature server 130. In a particular embodiment, the user profile is created by an operator of the feature server 130. In various embodiments, the feature server 130 is provided by a service provider. Prior to shipping the first communication device 105 to an end user, the first communication device 105 is provided with a default or base configuration file that is stored in the configuration files storage 110. The default configuration file includes an address associated with the feature server 130. In a particular embodiment, the address associated with the feature server is an IP address. In at least one embodiment, the first communication device 105 is shipped to an end user at the customer premises. In still other embodiments, a user may obtain the first communication device 105 from a retailer. In at least one embodiment, the first communication device 105 may be shipped with a quick start guide containing instructions instructing the user to connect the first communication device to a power source, such as a power outlet.

In step 505, the user connects the first communication device to a power source. In at least one embodiment, the user connects the first communication device 105 to a power source by plugging a power cord of the first communication device into a power outlet. In another embodiment, the user may connect the first communication device to a power source by installing batteries within the first communication device 105. In step 510, the user connects the first communication device 105 to a network connection. The network connection places the first communication device 105 in communication with the network(s) 125. In at least one embodiment, the network connection is an internet connection. In step 515, the first communication device 105 retrieves the feature server address from the default configuration file in response to connecting the first communication device 105 to the network connection. In at least one embodiment, the feature server address is an IP address associated with the feature server. In still other embodiments, the first communication device 105 may be connected to the internet connection prior to being connected to the power source. In still other embodiments, the network connection is a wireless connection that is established with the network(s) 125 after the first communication device 105 is powered-on.

In step 520, the first communication device 105 sends a registration request to the feature server at the feature server address retrieved from the default configuration file. The registration request includes an address associated with the first communication device 105 that is stored in a memory 120 of the first communication device 105. In a particular embodiment, the address associated with the first communication 105 is a MAC address. The registration request is received by the feature server 130, and the feature server 130 registers the first communication device 105 in response to receiving the registration request. The feature server 130 then sends a call request to the first communication device 105. In step 525, the first communication device 105 receives the call request from the feature server 130. In step 530, the user of the first communication device 105 answers the call request and a call session is established between the first communication device 105 and the feature server 130. In step 535, the first communication device 105 receives a prompt from the feature server 130 prompting a user of the first communication device 105 to provide a user identifier. In at least one embodiment, the prompt from the feature server may include an audio prompt instructing the user to provide a user identifier. In still other embodiments, the prompt from the feature server 130 may include a text prompt that is displayed on a display of the first communication device 105 instructing the user to provide a user identifier.

In step 540, the first communication device 105 receives the user identifier from the user. In at least one embodiment, the user provides the user identifier to the first communication device by speaking the user identifier into a microphone or handset of the first communication device 105. In other embodiments, the user provides the user identifier to the first communication device 105 by typing the user identifier on a keypad or other tactile input device of the first communication device 105. In step 545, the first communication device 105 sends the user identifier to the feature server 130. In step 550, the call session is disconnected. In a particular embodiment, the feature server 130 may prompt the user of the first communication device 105 by either voice or text to hang up the connection in order to disconnect the call session. In step 555, the first communication device 105 receives a reboot request from the feature server 130. In response to receiving the reboot request, the first communication device 105 reboots and/or restarts. In step 565, the first communication device 105 receives a user-specific configuration file associated with the user identifier from the feature server 130. In a particular embodiment, the user-specific configuration file is stored within the configuration file storage 110 of the first communication device 105. In some embodiments, the default configuration file and the user-specific configuration file are both stored within the configuration file storage 110. In still other embodiments, the user-specific configuration file may replace the default configuration file within the configuration file storage 110.

In step 570, the first communication device 105 is configured according to one or more configuration parameters within the user-specific configuration file. Once the first communication device 105 is configured according to the user-specific configuration file, the first communication device 105 may use call features provided by the feature server 130, as well as communicate with other communication devices in communication with the network(s) 125. For example, the first communication device 105 may place or receive a call to the second communication device 130, and establish a communication session between the first communication device 105 and the second communication device 130. In a particular embodiment, the established communication session between the first communication device 105 and the second communication device 135 is a voice call session. In step 575, the procedure 500 ends.

In alternative embodiments, the user of the first communication device 105 is prompted to enter the user identifier when the first communication device 105 is turned on for the first time by the user. In particular embodiments, the prompt includes one or more of a text prompt or a voice prompt. The user identifier is then communicated automatically to the feature server 130, and the feature server 130 registers the first communication device 105 in response to receiving the user identifier. In at least one embodiment, the user identifier is to sent to the feature server 130 as part of a registration request. At the same time as or immediately after the feature server 130 registers the first communication device 105, the feature server 130 automatically sends the user-specific configuration file to the first communication device 105. In response to receiving the user-specific configuration file, the first communication device 105 is configured according to one or more configuration parameters within the user-specific configuration file. Once the first communication device 105 is configured according to the user-specific configuration file, the first communication device 105 may use call features provided by the feature server 130, as well as communicate with other communication devices in communication with the network(s) 125.

In various embodiments, user initiated provisioning of communication devices, such as IP phones, eliminates the need to send a truck roll or a technician to a customer's premises. In some embodiments, the use of the IVR module 215 allows for a user to self-provision a communication device via voice while requiring little to no technical knowledge or expertise by the end user.

The illustrative embodiments can take the form of an entirely hardware embodiment, an entirely software embodiment, or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The computer-usable or computer-readable medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Further, a computer storage medium may contain or store a computer-readable program code, such that when the computer-readable program code is executed on a computer, the execution of this computer-readable program code causes the computer to transmit another computer-readable program code over a communication link. This communication link may use a medium that is, for example, without limitation, physical, or wireless.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for provisioning of a communication device comprising:
  receiving, at a feature server, a registration request from the communication device, the communication device being a wired voice over IP telephone, the registration request including an address associated with the communication device, the registration request initiated automatically in response to the communication device establishing a network connection and being powered on;
  registering the communication device in response to receiving the registration request;
  placing a call request to the communication device;
  in response to the call request being answered by a user, establishing a call session with the communication device;
  prompting the user of the communication device for a user identifier;
  receiving a user identifier from the user of the communication device;
  sending a reboot request to the communication device;
  disconnecting the call session with the communication device prior to sending one or more configuration parameters associated with the user identifier to the communication device; and after the communication device reboots, sending, in a user-specific configuration file, the one or more configuration parameters associated with the user identifier to the communication device after the call session has been disconnected, the one or more configuration parameters operable to configure the communication device.

2. The method of claim 1 further comprising:
storing the address associated the communication device in a user profile associated with the user identifier.

3. The method of claim 1, wherein configuring the communication device includes configuring calling features of the communication device, the calling features determined based on a preconfigured user profile associated with the communication device.

4. The method of claim 1, wherein receiving the user identifier from the communication device includes receiving a voice input from the communication device, the voice input including the user identifier.

5. The method of claim 3, wherein the calling features include call forwarding, selective call forwarding, selective call acceptance, selective call rejection, call blocking, conference calling, call directories, 911 services, and voice mail services.

6. A feature server for provisioning of a communication device comprising:
a memory; and
at least one processor, the at least one processor configured to retrieve computer readable instructions from the memory and execute the computer readable instruction so as to:
receive a registration request from the communication device, the communication device being a wired voice over IP telephone, the registration request including an address associated with the communication device;
register the communication device in response to receiving the registration request;
place a call request to the communication device;
establish a call session with the communication device;
prompt a user of the communication device for a user identifier;
receive the user identifier from the communication device;
send a reboot request to the communication device;
disconnect the call session with the communication device prior to sending one or more configuration parameters associated with the user identifier to the communication device; and
after the communication device reboots, send, in a user-specific configuration file, the one or more configuration parameters associated with the user identifier to the communication device after the call session has been disconnected, the one or more configuration parameters operable to configure the communication device.

7. The feature server of claim 6, wherein the at least one processor is further configured to:
store the address associated the communication device in a user profile associated with the user identifier.

8. The feature server of claim 6, wherein the user-specific configuration file is associated with the user identifier.

9. The feature server of claim 6, wherein receiving the user identifier from the communication device includes receiving a voice input from the communication device, the voice input including the user identifier.

10. The feature server of claim 6, wherein the at least one processor is further configured to:
create the user identifier;
create the user-specific configuration file; and
associate the user-specific configuration file with the user identifier.

11. A method for user-initiated provisioning a communication device comprising:
retrieving an address associated with a feature server from a default configuration file;
sending a registration request to the feature server, the registration request including an address associated with the communication device, the communication device being a wired voice over IP telephone, wherein the registration request is automatically sent by the communication device in response to a determination that the communication device is coupled to a power source and a network connection;
receiving a call request from the feature server in response to sending the registration request;
establishing a call session with the feature server;
receiving a prompt from the feature server for a user to provide a user identifier;
receiving a user identifier from the user;
sending the user identifier to the feature server;
receiving a reboot request from the feature server; and
disconnecting the call session with the feature server;
rebooting the communication device; and
after rebooting the communication device, receiving, in a user specific configuration file, one or more configuration parameters associated with the user identifier after the call session has been disconnected, the one or more configuration parameters operable to configure the communication device.

12. The method of claim 11, wherein receiving the user identifier from the user comprises receiving a voice input from the user.

13. The method of claim 11, wherein the user-specific configuration file is associated with the user identifier.

14. The method of claim 11, further comprising:
configuring the communication device according to the one or more configuration parameters.

* * * * *